US010169616B1

(12) United States Patent
Nertney (10) Patent No.: US 10,169,616 B1
(45) Date of Patent: Jan. 1, 2019

(54) CRYPTOGRAPHIC PROCESSING OF DATA AND INSTRUCTIONS STORED OFF-CHIP (71) Applicant: Xilinx, Inc., San Jose, CA (US)

(72) Inventor: Robert E. Nertney, Los Gatos, CA (US)

(73) Assignee: XILINX, INC., San Jose, CA (US)

(*) Notice: Subject to any disclaimer, the term of this patent is extended or adjusted under 35 U.S.C. 154(b) by 216 days.

(21) Appl. No.: 15/012,392

(22) Filed: Feb. 1, 2016

(51) Int. Cl.
*G06F 11/30* (2006.01)
*G06F 12/14* (2006.01)
*G06F 21/72* (2013.01)

(52) U.S. Cl.
CPC .................. *G06F 21/72* (2013.01)

(58) Field of Classification Search
None
See application file for complete search history.

(56) References Cited

U.S. PATENT DOCUMENTS

| 8,296,578 | B1* | 10/2012 | New | G06F 17/5054 326/38 |
| 2006/0059369 | A1* | 3/2006 | Fayad | G06F 21/6218 713/189 |
| 2006/0095793 | A1* | 5/2006 | Hall | G06F 12/145 713/190 |
| 2014/0181458 | A1* | 6/2014 | Loh | G06F 12/1027 711/206 |
| 2014/0310536 | A1* | 10/2014 | Shacham | G06F 21/78 713/193 |

* cited by examiner

*Primary Examiner* — Kambiz Zand
*Assistant Examiner* — Arezoo Sherkat
(74) *Attorney, Agent, or Firm* — LeRoy D. Maunu (57) ABSTRACT

A disclosed circuit arrangement includes an interconnect circuit, a processor, a first memory circuit, a proxy memory circuit, and a decryption circuit. The interconnect circuit receives a first transaction from one of the one or more processors and transmits the first transaction to the proxy memory circuit in response to a first address in a first transaction. The proxy memory circuit translates the first address into a second address of the first memory circuit, generates a second transaction including the second address, transmits the second transaction to the interconnect circuit, and receives encrypted data from the first memory circuit in a response to the second transaction. The decryption circuit decrypts the encrypted data into decrypted data, and the proxy memory circuit transmits the decrypted data to the one processor in a response to the first transaction.

15 Claims, 4 Drawing Sheets

CRYPTOGRAPHIC PROCESSING OF DATA AND INSTRUCTIONS STORED OFF-CHIP

TECHNICAL FIELD

The disclosure generally relates to cryptographic processing of data and instructions stored off-chip.

BACKGROUND

Many applications require plaintext information, for example data and/or program code, to remain within a single chip/device in order to reduce the risk of unauthorized disclosure of confidential or secret information. Information may be authenticated and stored off-chip in ciphertext form to prevent snooping and/or injecting malicious information. In some systems, specialized CPUs are employed to authenticate and decrypt information received from an off-chip memory device. The specialized CPUs may be slower than desired, because the same processor that executes instructions may also have to perform decryption tasks. Time spent decrypting is time not spent performing core tasks of the application.

Though advances in circuit integration are providing increasing quantities of on-chip memory, in many instances, the amount of on-chip memory is insufficient to fully store application information. Programmable integrated circuits (ICs) are examples of systems on a chip (SOCs) that have on-chip memory for application use. Generally, programmable ICs are devices that can be programmed to perform specified logic functions. A programmable IC may include programmable logic or a combination of programmable logic and hardwired logic, such as one or more microprocessors. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile may include both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a configuration data stream into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include one or more microprocessors that are capable of executing program code. The microprocessor can be fabricated as part of the same die that includes the programmable logic circuitry and the programmable interconnect circuitry, also referred to collectively as the "programmable circuitry" of the IC. It should be appreciated that execution of program code within a microprocessor is distinguishable from "programming" or "configuring" the programmable circuitry that may be available on an IC. The act of programming or configuring programmable circuitry of an IC results in the implementation of different physical circuitry as specified by the configuration data within the programmable circuitry. An SOC is an example of a programmable IC and may include a microprocessor, programmable logic, on-chip memory, various input/output (I/O) circuitry, and interconnect circuits for communicating between the micro-processor, programmable logic, and I/O circuitry.

SUMMARY

In one embodiment, a circuit arrangement includes an interconnect circuit, one or more processors coupled to the interconnect circuit, a first memory circuit coupled to the interconnect circuit, a proxy memory circuit coupled to the interconnect circuit, and a decryption circuit coupled to the proxy memory circuit. The interconnect circuit is configured and arranged to receive a first transaction from one of the one or more processors and transmit the first transaction to the proxy memory circuit in response to a first address in a first transaction. The proxy memory circuit is configured and arranged to translate the first address into a second address of the first memory circuit, generate a second transaction including the second address, transmit the second transaction to the interconnect circuit, and receive encrypted data from the first memory circuit in a response to the second transaction. The decryption circuit is configured and arranged to decrypt the encrypted data into decrypted data. The proxy memory circuit is further configured and arranged to transmit the decrypted data to the one processor in a response to the first transaction.

In another embodiment, an electronic system includes a programmable integrated circuit (IC), and the programmable IC includes a processor subsystem and a programmable logic subsystem. The processor subsystem includes an interconnect circuit and one or more processors coupled to the interconnect circuit. The programmable logic subsystem includes a proxy memory circuit, and the proxy memory circuit is configured in programmable logic circuits of the programmable logic subsystem and coupled to the interconnect circuit. The system further includes a first memory circuit coupled to the interconnect circuit. The interconnect circuit is configured and arranged to decode a first address in a first transaction from one of one or more processors and transmit the first transaction to the proxy memory circuit in response to the decoded address. The proxy memory circuit is configured and arranged to translate the first address into a second address of the memory circuit, generate a second transaction including the second address, transmit the second transaction to the interconnect circuit, and receive encrypted data from the first memory circuit in a response to the second transaction. The system further includes a decryption circuit coupled to the proxy memory circuit. The decryption circuit is configured and arranged to decrypt the encrypted data into decrypted data, and the proxy memory circuit is further configured and arranged to transmit the decrypted data to the one processor in a response to the first transaction.

A method of processing memory transactions is provided in another embodiment. The method includes receiving a first transaction from a processor by an interconnect circuit and routing the first transaction from the interconnect circuit to a proxy memory circuit in response to a first address in the first transaction. The proxy memory circuit translates the first address into a second address of a first memory circuit and generates a second transaction including the second address. The second transaction is transmitted from the proxy memory circuit to the interconnect circuit. The proxy memory circuit receives encrypted data from the first memory circuit in a response to the second transaction, and a decryption circuit decrypts the encrypted data into decrypted data. The proxy memory circuit transmits the decrypted data from the proxy memory circuit to the processor in a response to the first transaction.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches support off-chip storage of encrypted data. "Data" as used herein refers to all types of electronically stored information, including both program instructions and information processed and generated by the program instructions. Instead of consuming valuable processor cycles performing cryptographic operations, the cryptographic operations are offloaded from the processor to supporting circuitry. In addition, disclosed circuit arrangement and methods allow a developer to customize the cryptographic algorithms and the physical layout of the data in off-chip memory, which may provide greater efficiency and security. For example, formats can be changed, such as from AES-128 to AES-256 without requiring a new processor or ASIC. In addition, the developer can designate whether or not cryptography should be employed for certain data, thereby avoiding unnecessary processing for selected data.

In one implementation, a circuit arrangement includes one or more processors and an interconnect circuit that are communicatively coupled on a first IC die. A proxy memory circuit is also implemented on the first IC die and coupled to the interconnect circuit. An "off-chip" or "external" memory circuit is implemented on a second IC die and is coupled to the interconnect circuit. The address space accessible to the processors includes on-chip memory and off-chip memory. The processors issue memory transactions, which are transmitted to the interconnect circuit, and the interconnect circuit routes each transaction according to the address in the transaction. Access to encrypted data stored in the off-chip memory is made through references by a processor to address space assigned to the proxy memory circuit. When a transaction is received by the proxy memory circuit, the proxy memory circuit translates the address in the transaction into an address that references the off-chip memory circuit and generates another transaction having the translated address. The new transaction is sent to the interconnect circuit, and the interconnect circuit transmits the transaction to the off-chip memory, which sends the addressed data in a response to the proxy memory circuit. If the data received from the external memory is encrypted, the proxy memory circuit activates a decryption circuit, which is implemented on the first IC die, to decrypt the data. The proxy memory circuit then transmits the decrypted data to the processor in a response to the original transaction.

Figure 1:
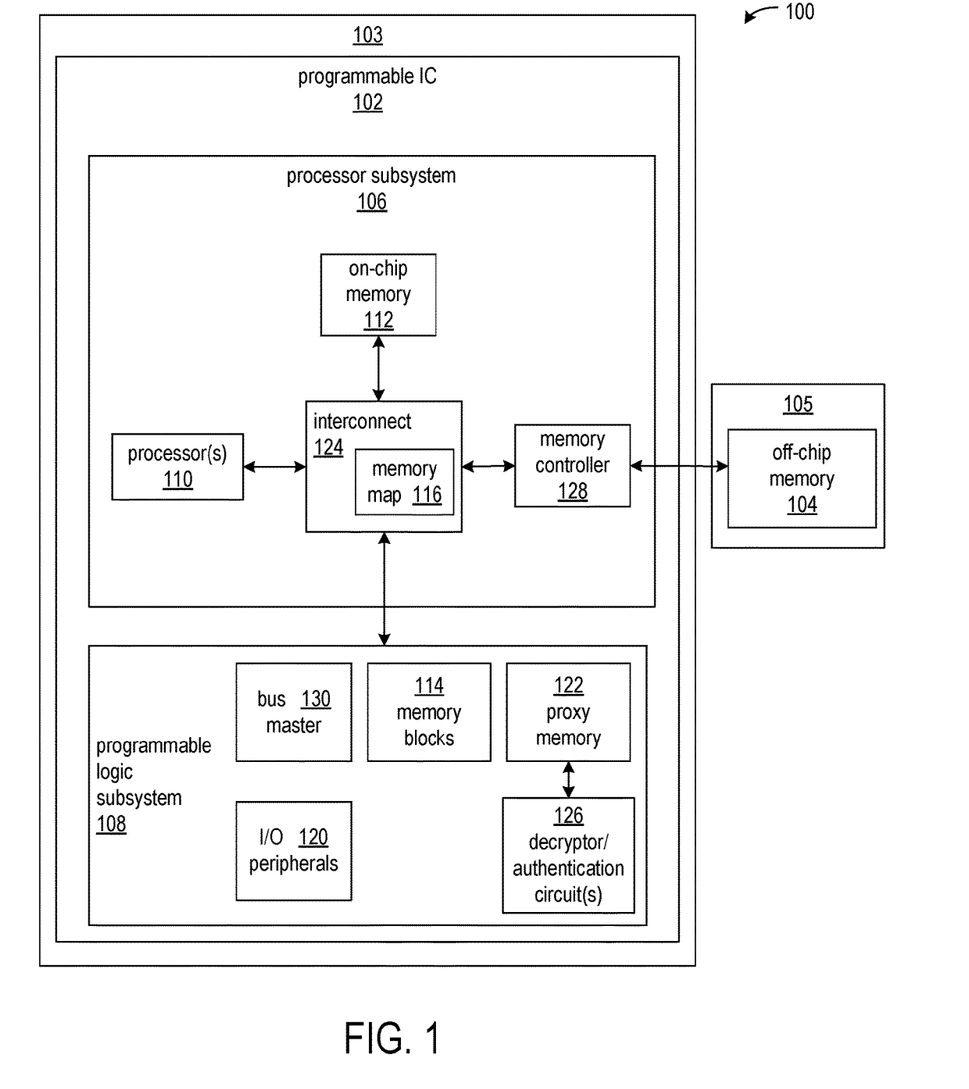
FIG. 1 shows a circuit arrangement that employs a proxy memory circuit in decrypting off-chip data.

FIG. 1 shows a circuit arrangement 100 that employs a proxy memory circuit in decrypting off-chip data. The circuit arrangement generally includes a programmable IC 102 that is coupled to an off-chip memory circuit 104. The programmable IC may be an SOC that is implemented on one IC die 103, and the off-chip memory circuit implemented on another IC die 105 that is physically separate from the IC die having the programmable IC.

The programmable IC includes a processor subsystem 106 and a programmable logic subsystem 108. The processor subsystem generally includes one or more processor cores 110, memory resources, and circuitry for connecting to the programmable logic subsystem. The programmable logic subsystem may include programmable logic (not shown), programmable interconnect (not shown) and various other circuitry such as that described above for an FPGA.

The programmable IC includes a number of memory resources that are accessible to program code executing on the processor core 110 or to a circuit implemented in the programmable logic subsystem. The memory resources include on-chip memory 112 and memory blocks 114 that may be configured in the programmable logic subsystem. The off-chip memory 104 may include double data rate (DDR) memory resources and provide additional storage for program code executing on the processor core or for circuits implemented in the programmable logic subsystem. The on-chip memory 112 and off-chip memory 104 may be implemented with SRAM or DRAM according to application requirements.

The physical address space of the programmable IC is mapped in memory map 116. The physical address space encompasses the on-chip memory 112 and off-chip memory 104, and in addition, address space available in the programmable logic subsystem 108, such as for I/O peripherals 120, memory blocks 114, and proxy memory circuit 122. The memory map may be a lookup table memory in which ranges of addresses are mapped to the component identifiers assigned to the address ranges. For example, one address range is mapped to on-chip memory 112, another address range is mapped to off-chip memory 104, another address range is mapped to I/O peripherals 120, and another address range is mapped to the programmable logic in which memory blocks 114 and the proxy memory circuit 122 may be implemented. The interconnect circuit 124 uses the memory map to direct a memory access request to the correct component. The connections between the interconnect circuit 124, processor(s) 110, on-chip memory 112, off-chip memory 104, and programmable logic subsystem 108 may be implemented consistent with the "Advanced eXtensible Interface" (AXI) bus protocol in an example implementation.

Access by processor(s) 110 to encrypted data stored in off-chip memory 104 is made through proxy memory circuit 122, which uses decryption circuit 126 in decrypting data from the off-chip memory, thereby offloading decryption processing from the processor(s). In an example implementation, a portion of the system address space designated to the programmable logic subsystem 108 is mapped by the proxy memory circuit to the off-chip memory. The processor(s) 110 initiates a transaction by generating a transaction having an address assigned to the proxy memory circuit and sending the transaction to the interconnect circuit 124. The interconnect circuit determines that the address in the transaction is assigned to the proxy memory circuit based on the configuration of the memory map 116 and sends the transaction to the proxy memory circuit. The proxy memory circuit translates the address of the received transaction into an address of the off-chip memory circuit based on configuration information stored in a memory (not shown) of the proxy memory circuit. With the off-chip memory address, the proxy memory circuit generates another transaction and transmits the new transaction to the interconnect circuit. The interconnect circuit determines from the memory map 116 that the address in the new transaction references off-chip memory 104 and transmits the transaction to the memory controller 128. The memory controller issues the transaction to the off-chip memory, and the response received from the off-chip memory is provided to the interconnect circuit, which routes the response back to the proxy memory circuit 122.

The proxy memory circuit receives the encrypted data in the response and activates decryption circuit 126 to decrypt the data. The proxy memory circuit then generates a response to the initial transaction from the processor(s), with the response including the decrypted data returned from the decryption circuit. The interconnect circuit 124 receives the response from the proxy memory circuit and transmits the response having the decrypted data to the processor.

In one implementation, the proxy memory circuit may be configurable as to which of the addresses of the off-chip memory contain encrypted data. The proxy memory circuit may include a memory circuit (not shown) that is configurable to store ranges of addresses and associated encryption flags that indicate whether or not each range of addresses stores encrypted data in the off-chip memory. The proxy memory circuit initiates decryption if the encryption flag associated with a requested address indicates the data at the address in the off-chip memory is encrypted, and decryption is bypassed if the encryption flag associated with a requested address indicates the data at the address in the off-chip memory is not encrypted.

In another implementation, the programmable IC 102 may include multiple decryption circuit(s) 126, and the proxy memory circuit may be user configurable as to which decryption circuit of the multiple different decryption circuits should be used. The proxy memory circuit may include a memory circuit (not shown) that is configurable to store a value that identifies the one of the decryption circuits to use in decrypting data from the off-chip memory, and when decryption is required, the proxy memory circuit selects the identified decryption circuit. In implementations having multiple alternative decryption circuits, the decryption circuits are compliant with different encryption/decryption standards or approaches, respectively. Examples of encryption/decryption standards/approaches include Triple-DES (Data Encryption Standard), Advanced Encryption Standard (AES), RSA, OpenPGP, etc.

The decryption circuit 126 may further include circuitry for authenticating data from the off-chip memory. The authentication circuitry may authenticate through different cryptographic hash functions or message authentication codes. In addition, the proxy memory circuit may include a memory circuit (not shown) that may be configured with ranges of off-chip memory addresses and associated signature values. The configurable address ranges and associated signatures allow specification of a pattern of data and signatures suitable for application requirements. For example, the entire off-chip memory may be covered by a single signature; the addresses of the off-chip memory may be organized by pages of addresses, and subsets of the pages may be covered with respective signatures; or each page of memory may be covered by a respective signature. In an implementation having different alternative decryption circuits, some decryption circuits may include authentication circuitry that may share features and circuitry with the decryption circuit. Also, circuit 126 may include multiple alternative authentication circuits. The alternative authentication circuits are compliant with different authentication approaches, respectively, and examples of authentication approaches or algorithms include message authentication codes and message integrity codes involving cryptographic hash functions or block cipher algorithms. In some implementations, the ranges of memory addresses covered by the associated signatures may be user configurable.

The decryption circuit 126 may be implemented as programmable logic circuitry in the programmable logic subsystem 108. Alternatively, the decryption circuit may be implemented as a hardwired logic circuit, either as part of the processor subsystem 106 or the programmable logic subsystem 108.

The off-chip memory 104 may be additionally accessed from bus master circuits other than processor(s) 110 in the processor subsystem 106. For example, a bus master circuit 130, such as a direct memory access (DMA) circuit or an application-specific logic circuit, may be implemented in the programmable logic subsystem 108 and may access the off-chip memory 104. The bus master circuit may be coupled to the interconnect circuit 124 in the processor subsystem 106 by way of a bus interface. Alternatively, the bus master circuit may be coupled directly to the proxy memory circuit 122.

Figure 2:
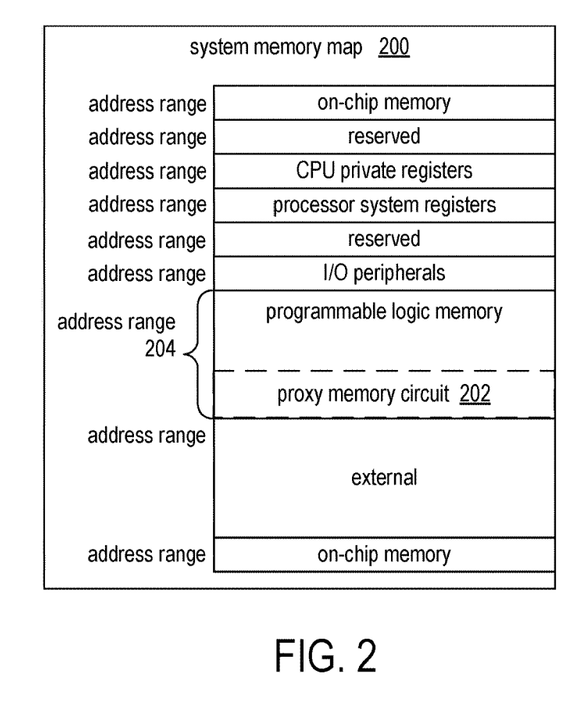
FIG. 2 shows a system memory map that may be applicable to the system of FIG. 1.

FIG. 2 shows a system memory map 200 that may be applicable to the system of FIG. 1. The memory map may be a lookup table memory that is addressable by addresses, or portions of the addresses, in the physical address space of the programmable IC 102. The address space may be divided into address ranges, with each address range mapped to a component or set of components addressed by the addresses in the associated address range.

The example system memory map includes address ranges mapped to on-chip memory, CPU private registers, processor system registers, I/O peripherals, programmable logic, and external memory. A portion of the address space that is mapped to programmable logic may be allocated to the proxy memory circuit, as illustrated by block 202, which is a portion of the address range 204. The dashed line signifies that there is no physical memory circuitry in the programmable logic for storage of data at addressees of the virtual memory block. Rather, all addresses in the range 202 are mapped to the proxy memory circuit, which remaps the addresses to off-chip memory addresses. Other portions of the address range 204 may be assigned to memory blocks 114 in the programmable logic subsystem 108.

Figure 3:
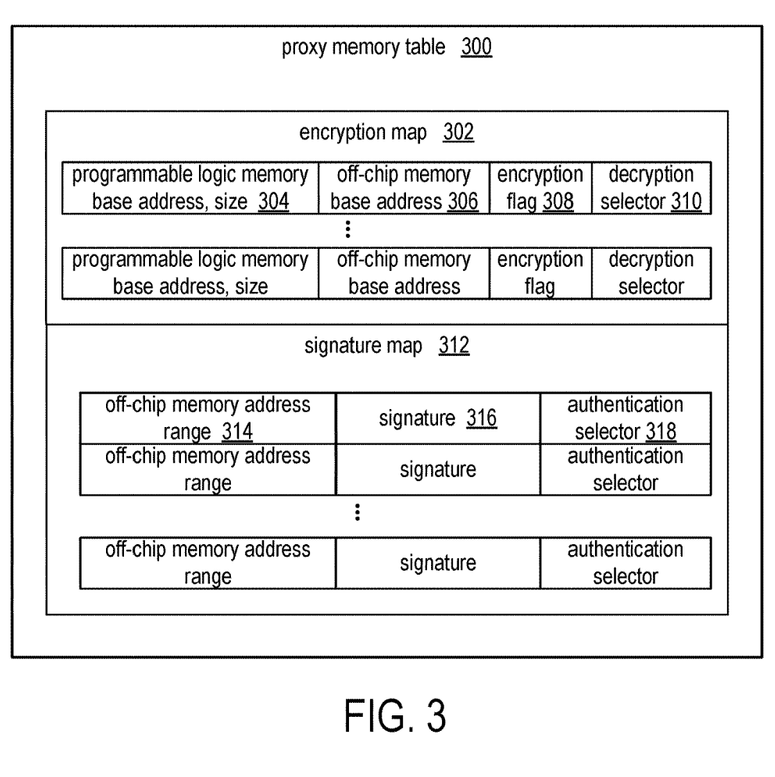
FIG. 3 shows a proxy memory table used by the proxy memory circuit to map programmable IC addresses to off-chip memory addresses and select decryption and authentication circuits.

FIG. 3 shows a proxy memory table 300 used by the proxy memory circuit to map programmable IC addresses to off-chip memory addresses and select decryption and authentication circuits. The proxy memory table may be implemented as one or more addressable memories, sets of registers or combinations thereof.

The proxy memory table 300 includes encryption map 302. Encryption map 302 specifies a mapping of programmable logic memory addresses to off-chip memory addresses and indicates which off-chip memory addresses store encrypted data. In one implementation, the encryption map has multiple entries, and each entry specifies a programmable logic memory base address and size (number of words or bytes), an associated off-chip memory base address, an encryption flag, and an associated decryption selector. For example, one entry includes block 304 as a programmable logic memory base address and size, block 306 as the associated off-chip memory base address, block 308 as the associated encryption flag, and block 310 as the associated decryption selector. The off-chip memory base address associated with a programmable logic memory base address indicates the address in the off-chip memory to which the programmable logic memory base address is mapped. The encryption flag indicates whether or not the associated data is encrypted. The decryption selector is a value that identifies one of multiple different decryption circuits, each decryption circuit employing a different decryption scheme.

The proxy memory table 300 includes signature map 312. The signature map has multiple entries, and each entry includes an off-chip memory address or range of addresses, an associated signature, and an associated authentication selector. For example, one entry includes block 314 as a range of off-chip memory addresses, block 316 as the signature associated with the range of off-chip memory addresses, and block 318 as the authentication selector associated with the range of off-chip memory addresses. The signature associated with an off-chip memory address or range of addresses is the expected value of a signature computed when data is read from the off-chip memory at the address or ranges of addresses. The authentication selector is a value that identifies one of multiple different authentication approaches.

Figure 4:
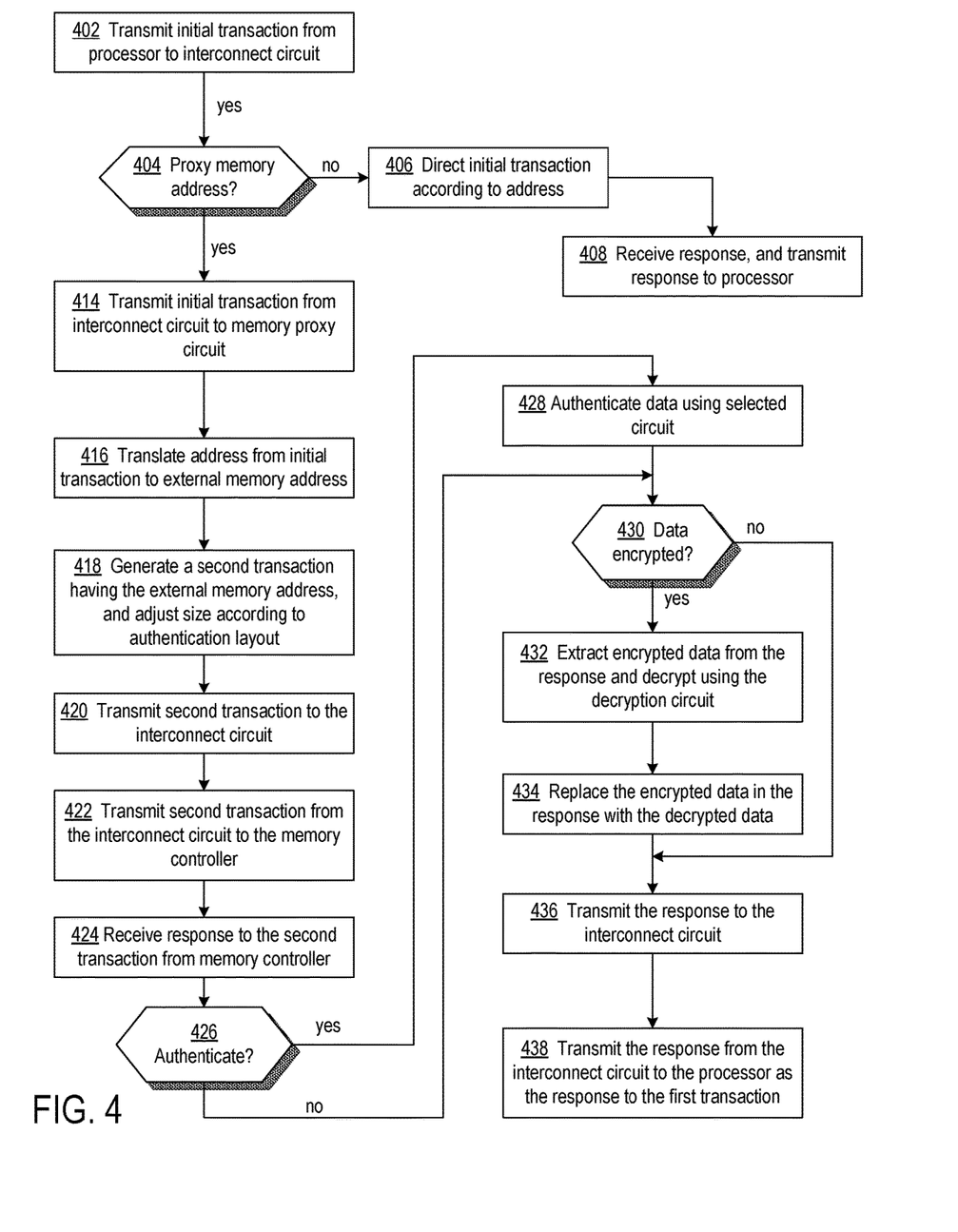
FIG. 4 is a flowchart of a process of processing an off-chip memory transaction.

FIG. 4 is a flowchart of a process of processing an off-chip memory transaction. At block 402, a transaction is transmitted from a processor to the interconnect circuit. The interconnect circuit determines at decision block 404, based on the system memory map, whether or not the address specified in the transaction is an address assigned to the proxy memory circuit. If the address is other than one assigned to the proxy memory circuit, for example an address of on-chip memory, programmable logic memory blocks, I/O peripherals, or off-chip memory, the interconnect circuit routes the transaction to the proper bus component at block 406. At block 408, the interconnect circuit receives a response to the transaction and transmits the response to the processor that initiated the transaction.

If the address is assigned to the proxy memory circuit, decision block 404 directs the process to block 414, where the interconnect circuit transmits the transaction to the proxy memory circuit. At block 416, the proxy memory circuit translates the address from the initial transaction into an external memory address using the encryption map. The proxy memory circuit generates a second transaction at block 418. The second transaction includes the external memory address.

In implementations supporting authentication and having customizable authentication patterns, the size of access specified by the initial transaction may be adjusted in the second transaction in order to obtain the data needed for proper authentication from the external memory. For example, if the size of a read transaction is less than the range of addresses covered by a signature, the size specified in the second transaction will be increased from the size in the initial transaction to a size spanning the range of addresses covered by a signature.

At block 420, the proxy memory circuit transmits the second transaction to the interconnect circuit, and at block 422, the interconnect circuit transmits the second transaction to the memory controller that controls the external memory. The interconnect circuit receives the response to the second transaction from the memory controller at block 424. Decision block 426 determines whether or not authentication is required for the requested addresses based on the signature map 304 (FIG. 3). If the requested address falls within a range having an associated signature, decision block 426 directs the process to block 428 at which the proxy memory circuit initiates authentication circuitry to authenticate the returned data using the associated signature. Otherwise, the process is directed to decision block 430. In one implementation, the proxy memory circuit may select one of multiple alternative authentication approaches based on the authentication selector associated with the range of addresses in the proxy memory table.

At decision block 430, the proxy memory circuit determines whether or not the returned data is encrypted based on the encryption flag associated with the address in the encryption map 302 (FIG. 3). If the requested address falls within a range of being encrypted, decision block 430 directs the process to block 432, otherwise the process is directed to block 436. At block 432, the proxy memory circuit extracts the encrypted data from the response and provides the encrypted data to a decryption circuit. In one implementation, the proxy memory circuit may select one of multiple alternative decryption circuits based on the decryption selector associated with the range of addresses in the proxy memory table. At block 434, the proxy memory circuit replaces the encrypted data in the response with the decrypted data. If the returned data is not encrypted, no decryption is needed and the data in the response remains unchanged. At block 436, the proxy memory circuit transmits the response to the interconnect circuit as the response to the initial transaction, and at block 438, the interconnect circuit transmits the response to the processor as the response to the initial transaction.

Figure 5:
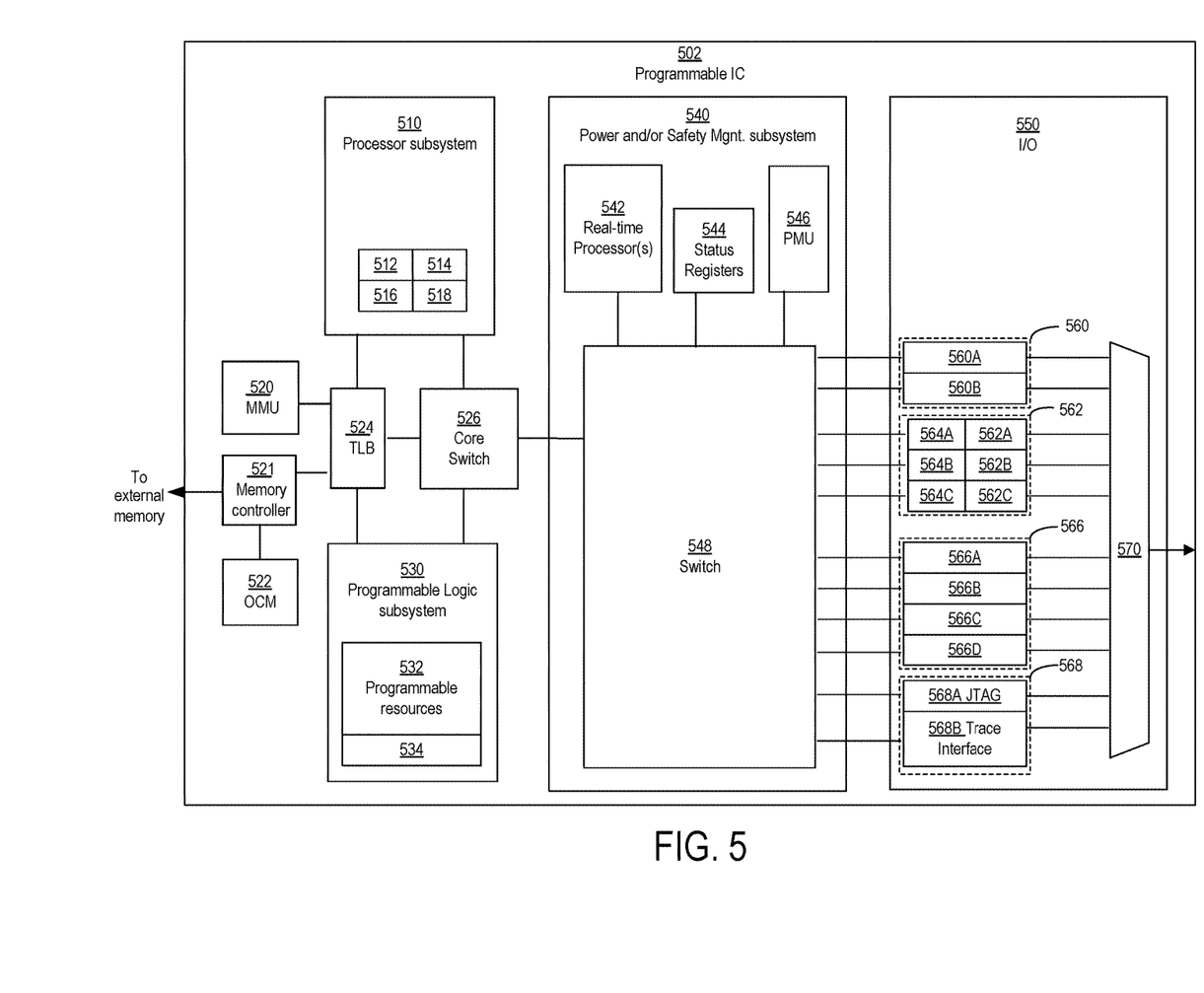
FIG. 5 shows a programmable IC that may be configured in accordance with one or more implementations.

FIG. 5 shows a programmable IC 502 that may be configured in accordance with one or more implementations. The programmable IC may also be referred to as a System On Chip (SOC), which includes a processor subsystem 510 and a programmable logic subsystem 530. The processor subsystem 510 may be programmed to implement a software portion of the user design, via execution of a user program. The program may be specified as part of a configuration data stream or may be retrieved from an on-chip or off-chip data storage device. The processor subsystem 510 may include various circuits 512, 514, 516, and 518 for executing one or more software programs. The circuits 512, 514, 516, and 518 may include, for example, one or more processor cores, floating point units (FPUs), an interrupt processing unit, on chip-memory, memory caches, and/or cache coherent interconnect.

The programmable logic subsystem 530 of the programmable IC 502 may be programmed to implement a hardware portion of a user design. For instance, the programmable logic subsystem may include a number of programmable resources 532, which may be programmed to implement a set of circuits specified in a configuration data stream. The programmable resources 532 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 532 may be programmed by loading a configuration data stream into the configuration memory cells, which define how the programmable interconnect circuits and programmable logic circuits are configured. The collective states of the individual memory cells then determine the function of the programmable resources 532. The configuration data can be read from memory (e.g., from an external PROM) or written into the programmable IC 502 by an external device. In some implementations, configuration data may be loaded into configuration memory cells by a configuration controller 534 included in the programmable logic subsystem 530. In some other implementations, the configuration data may be loaded into the configuration memory cells by a start-up process executed by the processor subsystem 510.

The programmable IC 502 may include various circuits to interconnect the processor subsystem 510 with circuitry implemented within the programmable logic subsystem 530. In this example, the programmable IC 502 includes a core switch 526 that can route data signals between various data ports of the processor subsystem 510 and the programmable logic subsystem 530. The core switch 526 may also route data signals between either of the programmable logic or processing subsystems 510 and 530 and various other circuits of the programmable IC, such as an internal data bus. Alternatively or additionally, the processor subsystem 510 may include an interface to directly connect with the programmable logic subsystem—bypassing the core switch 526. Such an interface may be implemented, for example, using the AMBA AXI Protocol Specification (AXI) as published by ARM.

In some implementations, the processor subsystem 510 and the programmable logic subsystem 530 may also read or write to memory locations of an on-chip memory 522 or off-chip memory (not shown) via memory controller 521. The memory controller 521 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 521 is able to communicate is provided for purposes of illustration only and is not intended as a limitation or to be exhaustive. As shown in FIG. 5, the programmable IC 502 may include a memory management unit 520 and translation look-aside buffer 524 to translate virtual memory addresses used by the subsystems 510 and 530 to physical memory addresses used by the memory controller 521 to access specific memory locations.

The programmable IC may include an input/output (I/O) subsystem 550 for communication of data with external circuits. The I/O subsystem 550 may include various types of I/O devices or interfaces including for example, flash memory type I/O devices, higher performance I/O devices, lower performance interfaces, debugging I/O devices, and/or RAM I/O devices.

The I/O subsystem 550 may include one or more flash memory interfaces 560 illustrated as 560A and 560B. For example, one or more of flash memory interfaces 560 can be implemented as a Quad-Serial Peripheral Interface (QSPI) configured for 4-bit communication. One or more of flash memory interfaces 560 can be implemented as a parallel 8-bit NOR/SRAM type of interface. One or more of flash memory interfaces 560 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 550 can include one or more interfaces 562 providing a higher level of performance than flash memory interfaces 560. Each of interfaces 562A-562C can be coupled to a DMA controller 564A-564C respectively. For example, one or more of interfaces 562 can be implemented as a Universal Serial Bus (USB) type of interface. One or more of interfaces 562 can be implemented as a gigabit Ethernet type of interface. One or more of interfaces 562 can be implemented as a Secure Digital (SD) type of interface.

The I/O subsystem 550 may also include one or more interfaces 566 such as interfaces 566A-566D that provide a lower level of performance than interfaces 562. For example, one or more of interfaces 566 can be implemented as a General Purpose I/O (GPIO) type of interface. One or more of interfaces 566 can be implemented as a Universal Asynchronous Receiver/Transmitter (UART) type of interface. One or more of interfaces 566 can be implemented in the form of a Serial Peripheral Interface (SPI) bus type of interface. One or more of interfaces 566 can be implemented in the form of a Controller-Area-Network (CAN) type of interface and/or an I$^2$C type of interface. One or more of interfaces 566 also can be implemented in the form of a timer type of interface.

The I/O subsystem 550 can include one or more debug interfaces 568 such as processor JTAG (PJTAG) interface 568A and a trace interface 568B. PJTAG interface 568A can provide an external debug interface for the programmable IC 502. Trace interface 568B can provide a port to receive debug, e.g., trace, information from the processor subsystem 510 or the programmable logic subsystem 530.

As shown, each of interfaces 560, 562, 566, and 568 can be coupled to a multiplexer 570. Multiplexer 570 provides a plurality of outputs that can be directly routed or coupled to external pins of the programmable IC 502, e.g., balls of the package within which the programmable IC 502 is disposed. For example, I/O pins of programmable IC 502 can be shared among interfaces 560, 562, 566, and 568. A user can configure multiplexer 570, via a configuration data stream to select which of interfaces 560-568 are to be used and, therefore, coupled to I/O pins of programmable IC 502 via multiplexer 570. The I/O subsystem 550, may also include a fabric multiplexer I/O (FMIO) interface (not shown) to connect interfaces 562-568 to programmable logic circuits of the programmable logic subsystem. Additionally or alternatively, the programmable logic subsystem 530 can be configured to implement one or more I/O circuits within programmable logic. In some implementations, the programmable IC 502 may also include a subsystem 540 having various circuits for power and/or safety management. For example, the subsystem 540 may include a power management unit 546 configured to monitor and maintain one or more voltage domains used to power the various subsystems of the programmable IC 502. In some implementations, the power management unit 546 may disable power of individual subsystems, when idle, to reduce power consumption, without disabling power to subsystems in use.

The subsystem 540 may also include safety circuits to monitor the status of the subsystems to ensure correct operation. For instance, the subsystem 540 may include one or more real-time processors 542 configured to monitor the status of the various subsystems (e.g., as indicated in status registers 544). The real-time processors 542 may be configured to perform a number of tasks in response to detecting errors. For example, for some errors, the real-time processors 542 may generate an alert in response to detecting an error. As another example, the real-time processors 542 may reset a subsystem to attempt to restore the subsystem to correct operation. The subsystem 540 includes a switch network 548 that may be used to interconnect various subsystems. For example, the switch network 548 may be configured to connect the various subsystems 510, 530, and 540 to various interfaces of the I/O subsystem 550. In some applications, the switch network 548 may also be used to isolate the real-time processors 542 from the subsystems that are to be monitored. Such isolation may be required by certain application standards (e.g., IEC-61508 SIL3 or ISO-26262 standards) to ensure that the real-time processors 542 are not affected by errors that occur in other subsystems.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for cryptographic processing of off-chip data. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement, comprising:
 a programmable integrated circuit (IC) including:
  a processor subsystem including:
   an interconnect circuit; and
   one or more processors coupled to the interconnect circuit; and
  a programmable logic subsystem providing a first address space and including:
   a proxy memory circuit coupled to the interconnect circuit and implemented in programmable logic circuitry of the programmable logic subsystem; and
   a decryption circuit coupled to the proxy memory circuit and implemented in programmable logic circuitry of the programmable logic subsystem; and
 a first memory circuit providing a second address space, external to the programmable IC, coupled to the interconnect circuit;
 wherein the interconnect circuit is configured and arranged to receive a first transaction from one of the one or more processors and transmit the first transaction to the proxy memory circuit in response to a first address of the first address space in the first transaction;
 wherein the proxy memory circuit is configured and arranged to translate the first address into a second address of the second address space, generate a second transaction including the second address, transmit the second transaction to the interconnect circuit, and receive encrypted data from the first memory circuit in a response to the second transaction;
 wherein the decryption circuit is configured and arranged to decrypt the encrypted data into decrypted data; and
 wherein the proxy memory circuit is further configured and arranged to transmit the decrypted data to the one processor in a response to the first transaction.

2. The circuit arrangement of claim 1, wherein:
 the proxy memory circuit includes a second memory circuit configured with ranges of memory addresses, and the ranges of memory addresses indicate addresses having encrypted data; and
 the proxy memory circuit is further configured and arranged to provide the encrypted data to the decryption circuit in response to the ranges of memory addresses indicating that the first address has encrypted data.

3. The circuit arrangement of claim 1, wherein the decryption circuit is further configured and arranged to authenticate the encrypted data.

4. The circuit arrangement of claim 3, wherein the proxy memory circuit includes a second memory circuit configured with user configurable ranges of memory addresses and associated signature values.

5. The circuit arrangement of claim 1, further comprising:
 a plurality of alternative decryption circuits coupled to the proxy memory circuit, wherein the decryption circuit is one decryption circuit of the plurality of alternative decryption circuits, and the alternative decryption circuits are compliant with different decryption standards, respectively;
 wherein the proxy memory circuit includes a second memory circuit configured with a value that selects the one alternative decryption circuit.

6. The circuit arrangement of claim 5, wherein the plurality of alternative decryption circuits are further configured and arranged to authenticate the encrypted data using different authentication algorithms, respectively.

7. The circuit arrangement of claim 1, wherein the one or more processors, interconnect circuit, and proxy memory circuit are disposed on a first die, and the first memory circuit is disposed on a second die.

8. A method of processing memory transactions, comprising:
 receiving a first transaction from a processor implemented on a first die in a processor subsystem of a programmable integrated circuit (IC) by an interconnect circuit implemented on the first die in the processor subsystem;
 transmitting the first transaction from the interconnect circuit to a proxy memory circuit, implemented on the first die in a programmable logic subsystem of the programmable IC, in response to a first address in the first transaction the first address referencing a first address space of the programmable logic subsystem;

translating the first address into a second address of a second address space of a first memory circuit disposed on a second die by the proxy memory circuit;

generating a second transaction including the second address by the proxy memory circuit;

transmitting the second transaction from the proxy memory circuit to the interconnect circuit;

receiving encrypted data from the first memory circuit at the proxy memory circuit in a response to the second transaction;

decrypting the encrypted data into decrypted data by a decryption circuit; and transmitting the decrypted data from the proxy memory circuit to the processor in a response to the first transaction.

9. The method of claim 8, further comprising:

storing in a second memory circuit, data indicating ranges of addresses having encrypted data;

determining whether or not data at the second address is encrypted based on data stored on the second memory circuit; and providing the encrypted data from the proxy memory circuit to the decryption circuit in response to determining that the data at the second address is encrypted.

10. The method of claim 8, further comprising authenticating the encrypted data by the decryption circuit.

11. The method of claim 10, wherein the authenticating includes reading from a second memory circuit a signature associated with the second address.

12. The method of claim 8, further comprising selecting one of a plurality of alternative decryption circuits in response to data stored in a second memory circuit indicating the one of the plurality of alternative decryption circuits.

13. The method of claim 12, authenticating the encrypted data by the one of the plurality of alternative decryption circuits.

14. The method of claim 8, further comprising
transmitting the second transaction from the interconnect circuit on the first die to the first memory circuit on the second die.

15. The method of claim 14, wherein the decrypting includes decrypting the encrypted data by the decryption circuit in programmable logic circuitry of the programmable logic subsystem.

* * * * *